UNITED STATES PATENT OFFICE.

ANTON WEINDEL, OF MÜLHEIM-ON-THE-RHINE, GERMANY, ASSIGNOR TO FARBEN-FABRIKEN VORM. FRIEDR. BAYER & CO., OF ELBERFELD, GERMANY, A CORPORATION OF GERMANY.

HYDROSULFITE COMPOUND AND PROCESS OF MAKING SAME.

961,391.   Specification of Letters Patent.   Patented June 14, 1910.

No Drawing.   Application filed December 21, 1909.   Serial No. 534,350.

*To all whom it may concern:*

Be it known that I, ANTON WEINDEL, doctor of philosophy, chemist, citizen of the German Empire, residing at Mülheim-on-the-Rhine, Prussia, Germany, have invented new and useful Improvements in New Double Compound of Zinc Hydrosulfite Sodium Sulfite and process of Making Same, of which the following is a specification.

It is alleged that if bisulfite is treated with zinc dust with addition of such a quantity of mineral acid that it is less than the quantity calculated according to the equation:

a zinc hydrosulfite is obtained which is difficultly soluble in water. Investigation however has shown that no zinc hydrosulfite is produced by this process but a double salt consisting of varying amounts of zinc, sodium, sulfurous and hydrosulfurous acid.

I have made the surprising discovery that contrary to the present knowledge according to which excess of acid must be absolutely avoided with zinc hydrosulfite, an exceedingly stable double salt, $2ZnS_2O_4.Na_2SO_3$, containing a very high percentage of zinc hydrosulfite (75.5 per cent.) is obtained if solid or dissolved bisulfites are added to a solution of zinc hydrosulfite; the present invention relates to the manufacture and production of this new salt.

In order to illustrate the new process more fully the following example is given, the parts being by weight. To 100 parts of a solution of zinc hydrosulfite containing 32.5 per cent. $ZnS_2O_4$, 92 parts of a solution of sodium bisulfite of 37° Bé. are added. The mixture thus obtained is then stirred for some time while it is gently heated to about 55° C. The above mentioned double compound which separates out during the heating is thus obtained in the shape of granular crystals.

The formation of my new compound probably takes place according to the following formula:

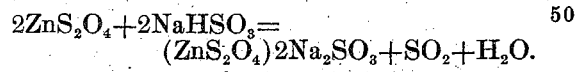

The new salt thus obtained has a white color showing a slight yellow tint. 4 parts of it are soluble in 100 parts of water at the ordinary temperature. It is insoluble in organic solvents such as alcohol, ether and benzene, soluble in caustic soda lye; the sodium salt of hydrosulfurous acid being formed, while the zinc is precipitated as $Zn(OH)_2$ being dissolved again by an excess of alkali as zincate. 1 gram of sulfur contained in the double salt reduces about 3,291 grams of indigotin.

My new compound may be employed as an agent of reduction and also as a starting material for the manufacture of sodium hydrosulfite.

The bisulfite employed in the above process can also be used in a solid state.

I claim—

1. The herein described process for producing a new solid and stable zinc hydrosulfite sodium sulfite $(2ZnS_2O_4.Na_2SO_3)$, which process consists in treating mixing together and crystallizing solutions of zinc hydrosulfite with alkali bisulfite, substantially as described.

2. The herein described zinc hydrosulfite sodium sulfite of the formula:

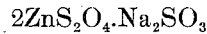

which is a stable white compound of a slight yellow tint soluble in water, insoluble in alcohol, ether and benzene, soluble in caustic soda lye, the sodium salt of hydrosulfurous acid being formed, while zinc is precipitated as $Zn(OH)_2$ being dissolved again by an excess of alkali as zincate, substantially as described.

In testimony whereof I have hereunto set my hand in the presence of two subscribing witnesses.

ANTON WEINDEL. [L. S.]

Witnesses:
OTTO KÖNIG,
CHAS. J. WRIGHT.